United States Patent [19]

de la Chapelle

[11] Patent Number: 5,001,336

[45] Date of Patent: Mar. 19, 1991

[54] OPTICAL SIGNAL SUMMING DEVICE

[75] Inventor: Michael de la Chapelle, Bellevue, Wash.

[73] Assignee: The Boeing Company, Seattle, Wash.

[21] Appl. No.: 448,751

[22] Filed: Dec. 11, 1989

[51] Int. Cl.$^5$ .............................................. H01J 40/14
[52] U.S. Cl. .............................. 250/208.2; 324/77 K; 343/843
[58] Field of Search .................. 250/208.2, 227.11; 324/77 K; 343/853, 701, 703; 342/175

[56] References Cited

U.S. PATENT DOCUMENTS

| | | | |
|---|---|---|---|
| 3,389,341 | 6/1968 | Thomas | 329/144 |
| 4,068,237 | 1/1978 | Jones, Jr. | 343/112 C |
| 4,091,327 | 5/1978 | Larsen et al. | 324/95 |
| 4,216,474 | 8/1980 | Levine | 342/175 |
| 4,536,762 | 8/1985 | Moates | 340/870.02 |
| 4,594,557 | 6/1986 | Shillady | 329/160 |
| 4,650,993 | 3/1987 | Boella et al. | 250/231 SE |
| 4,686,533 | 8/1987 | MacDonald et al. | 342/373 |
| 4,885,589 | 12/1989 | Edward et al. | 342/175 |

Primary Examiner—David C. Nelms
Assistant Examiner—K. Shami
Attorney, Agent, or Firm—Christensen, O'Connor, Johnson & Kindness

[57] ABSTRACT

A device for receiving intensity modulated optical input signals, and producing an electronic output signal having a magnitude corresponding to the sum of the intensities of the input signals. The device comprises a plurality of photodetectors for receiving the input signals, the photodetectors being connected in parallel between first and second conductor lines. The photodetectors are reverse biased, preferably through a low pass filter, and a high pass filter is positioned between the conductor lines and a pair of output terminals at which the output signal is produced. The device may also include frequency compensation and/or impedance matching means connected between the high pass filter and the output terminals. Where the input signals are provided on fiber-optic cables or optical waveguides, means may also be provided for positioning the fiber-optic cables or waveguides such that the input signals are efficiently coupled onto the photodetectors.

9 Claims, 5 Drawing Sheets

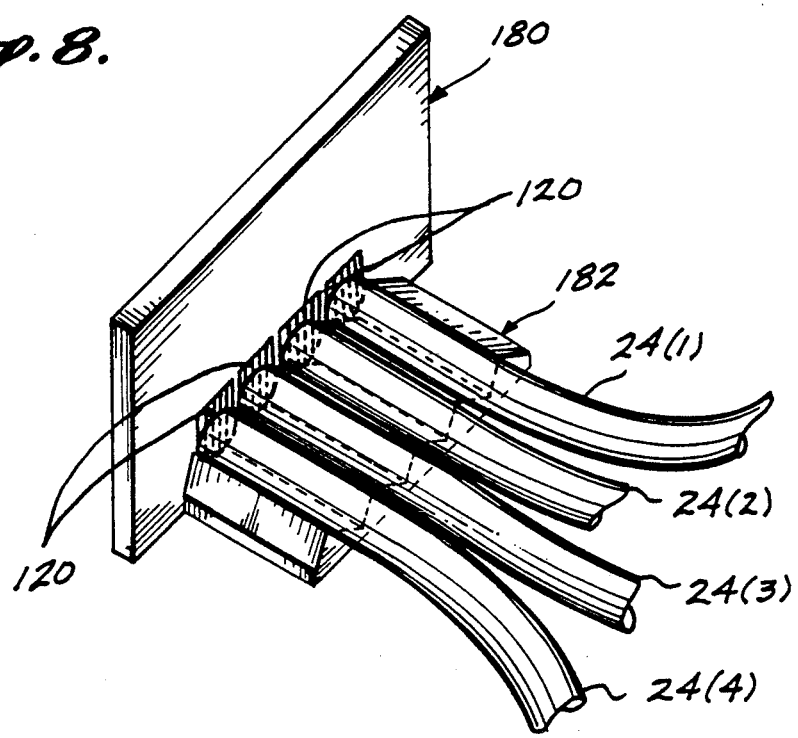
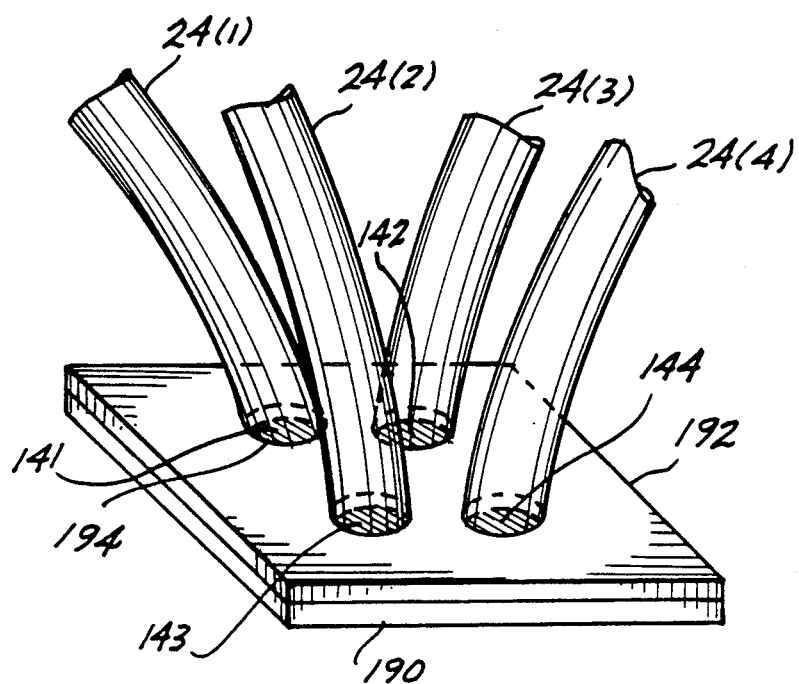

OPTICAL SIGNAL SUMMING DEVICE

FIELD OF THE INVENTION

The present invention relates to electro-optic signal processing, and in particular to a process for incoherently summing a plurality of optical signals. The invention has applications in fields such as radar and RF communication.

BACKGROUND OF THE INVENTION

Analog information is most commonly transmitted on optical fibers as an intensity modulated optical signal, and there are numerous signal processing applications that require such signals to be summed. One such application is in phased-array radar. In a phase-array radar system, the signals received by the individual antenna elements are phase-delayed, and then combined in a predetermined manner to electronically point the antenna beam in a particular direction.

In one known type of phased-array system, the electronic signal detected at each antenna element is amplified and then converted into an optical signal that is coupled into a plurality of fiber-optic cables. Each fiber-optic cable has a particular length, and therefore subjects an optical signal passing through it to a particular time or phase delay. In order to detect a signal arriving from a particular direction, the signals on a selected group of fiber-optic cables (one from each antenna element) are combined and summed to produce an electronic output signal. The lengths of the selected fiber-optic cables are such that a signal received at the antenna elements from the particular direction will result in fiber-optic cable signals that arrive simultaneously at the summing point.

In order to sum the optical signals on a particular group of fiber-optic cables, each optical signal is typically converted to an electrical signal, and the electrical signals are then input to an RF power combiner. Directly combining the optical signals in an optical coupler is not feasible, because it will produce coherent optical summing, and thereby cause unacceptable noise resulting from mixing products between the carrier frequencies of the signals that are being detected. To avoid the production of such mixing products, each carrier must have the same phase and frequency, a nearly impossible requirement in most systems. There is therefore a need for a simple technique for summing intensity modulated optical signals that may have different phases and/or carrier frequencies.

SUMMARY OF THE INVENTION

The present invention solves the problem of incoherent summing of multiple, intensity modulated optical signals in a simple and inexpensive device that can be fabricated in miniaturized form. The invention produces an electronic output signal that is proportional to the sum of the optical intensities of the input signals. The summing operation can be performed on coherent or incoherent optical input signals having modulation bandwidths in excess of 20 GHz.

In the preferred embodiment, the optical summing device of the present invention comprises a plurality of photodetectors connected with one another in parallel between first and second common conductor lines, each photodetector receiving one of the optical signals to be summed. A bias voltage is applied between the conductor lines, such that each photodetector is reverse-biased. The device also comprises a pair of output terminals, and high-pass filter means connected between the conductor lines and the output terminals. In response to receipt of the optical signals to be summed, the device produces an output signal at the output terminals, the output signal having a magnitude corresponding to the sum of the intensities of the input signals.

The means for applying a bias voltage may comprise a voltage source connected to the common conductor lines via a low-pass filter. The device may also comprise a frequency compensation and/or impedance matching circuit connected between the high-pass filter and the output terminals. The photodetectors may be arranged in linear or rectangular arrays, and means may also be provided for accurately positioning the fiber-optic cables such that the optical input signals are efficiently coupled to the photodetectors.

BRIEF DESCRIPTION OF THE DRAWINGS

FIG. 8 is a schematic perspective view illustrating the coupling of the optical signals to the photodiode array.

FIG. 9 is a second preferred embodiment showing the coupling of the optical signals to the photodiode array.

DETAILED DESCRIPTION OF THE PREFERRED EMBODIMENT

Figure 1:
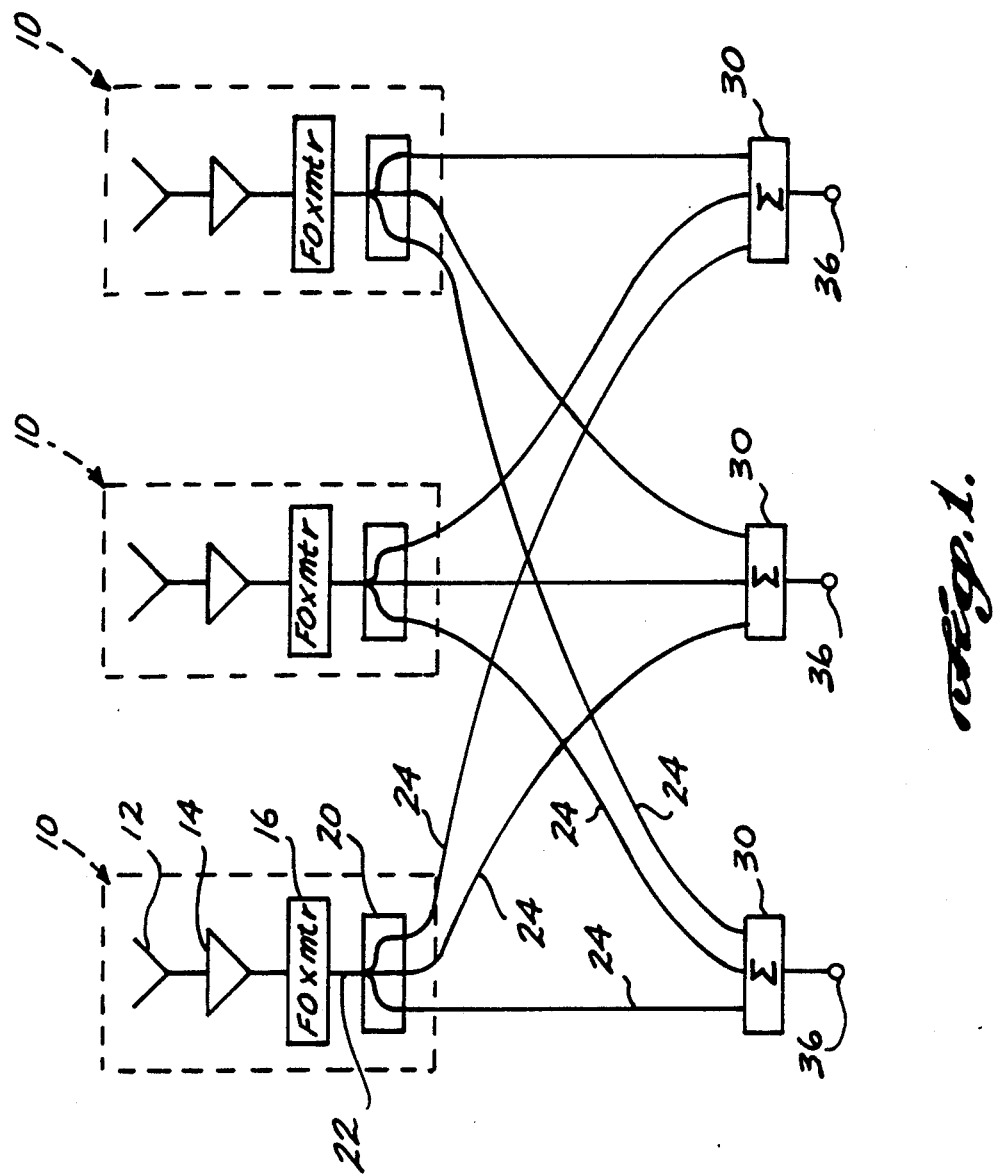
FIG. 1 is a schematic diagram of a phased-array radar system.
Figure 2:
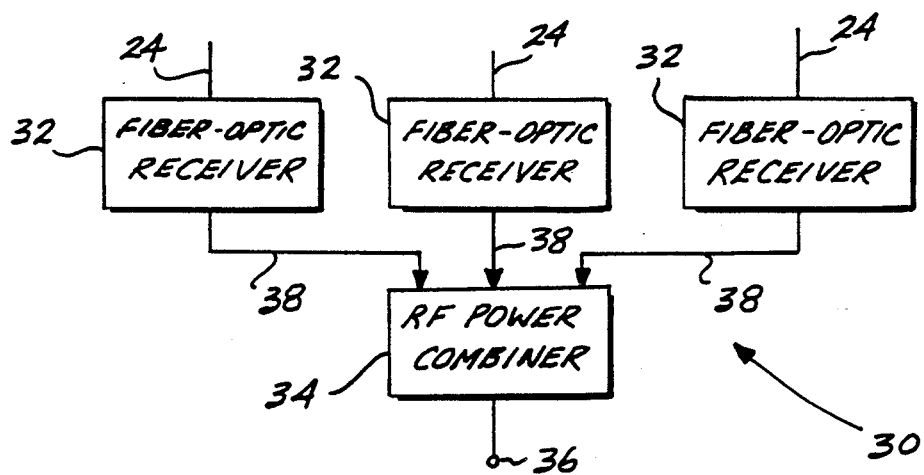
FIG. 2 is a block diagram of a prior art summing unit.

FIGS. 1 and 2 illustrate a simple (i.e., 3-element) prior art phased-array antenna system. The overall system shown in FIG. 1 comprises three antenna units 10 and three summing units 30. Each antenna unit comprises an antenna 12, a low noise amplifier 14, a fiber-optic transmitter 16, and a 1×3 fiber-optic coupler 20. A signal detected by antenna 12 is amplified by amplifier 14, and the electronic signal generated by the amplifier is converted into an optical signal by transmitter 16, and launched into fiber-optic cable 22. Coupler 20 divides the optic signal on fiber-optic cable 22 into three optical signals on fiber-optic cables 24. The signal on each fiber-optic cable 24 comprises an optical carrier generated by one of the fiber-optic transmitters 16, the carrier being modulated by the strength of the signal received by the associated antenna 12.

Referring to FIG. 2, each prior art summing unit 30 comprises three fiber-optic receivers 32 and an RF power combiner 34. The three fiber-optic receivers of each summing unit are connected to three of fiber-optic cables 24, one from each antenna unit. Each receiver 32 converts the optical signal into a corresponding electrical signal on line 38. Each power combiner receives three such electrical signals, one from each fiber-optic receiver, and combines such signals to produce a corresponding output signal at output terminal 36. The RF power of the output signal is proportional to the amount of RF power received in a given antenna beam direction, the beam direction being determined by the time delays introduced into the signals by the relative lengths of fiber-optic cables 24. The output of the power combiner at each terminal 36 therefore represents a beam that has a particular orientation or direction with respect to the antenna array. The system shown in FIGS. 1 and 2 would therefore be capable of detecting signals received from three predetermined directions. Such a system might be used, for example, in an earth-based receiver for receiving signals from one or more geosynchronous satellites.

The intensity modulated optical signals that are input to each summing unit 30 cannot simply be optically summed using an optical coupler, because each optical signal is produced by a different laser in one of fiber-optic transmitters 16. The prior art technique shown in FIG. 2 therefore individually detects the optical intensity modulation of each signal, and then electronically sums the electronic signals to produce the desired antenna beam signal. Wilkinson power dividers and combiners and directional couplers are often used for RF power combining and dividing. These components can be heavy and bulky, and vulnerable to EMI/EMP.

The present invention provides a technique for directly summing coherent or incoherent optical signals, to produce a corresponding electronic summation signal. Thus the present invention may be used to replace the fiber-optic receivers and the RF power combiners shown in FIG. 2. In particular, the present invention provides a summing array that receives the optical signals from the antenna units via fiber-optic cables 24, and produces an electronic output signal directly, without separate photodetection and summation stages.

Figure 3:
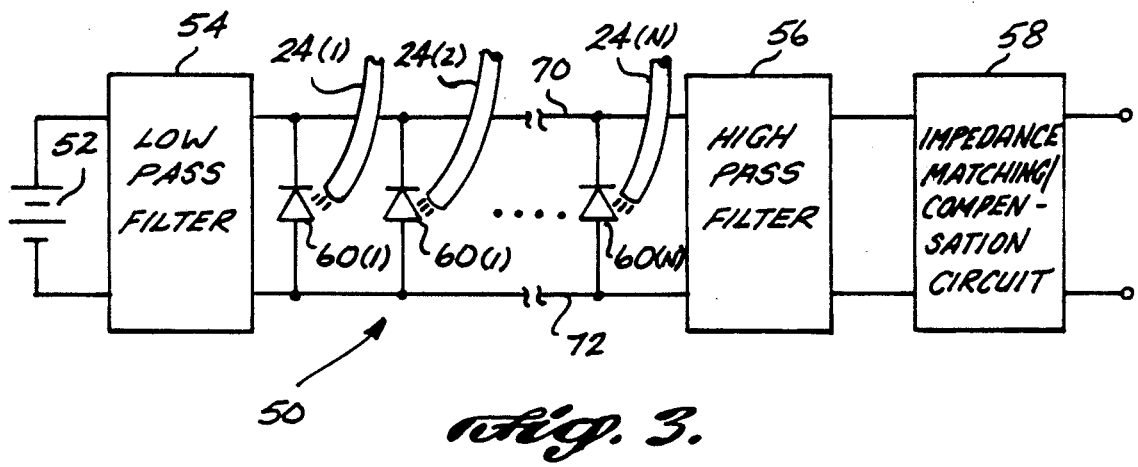
FIG. 3 is a block diagram of the optical summing device of the present invention.

A preferred embodiment of the invention is shown schematically in FIG. 3. The illustrated device comprises photodetector array 50, voltage source 52, low-pass filter 54, high-pass filter 56, and impedance matching/compensation circuit 58. Photodetector array 50 comprises a plurality of photodetectors 60(1) through 60(N) connected in parallel between lines 70 and 72. The optical signals to be summed are provided on fiber-optic cables 24(1) through 24(N), and these fiber-optic cables are positioned such that the optical signals exiting from the ends of the fiber-optic cables strike the respective photodetectors. The photodetectors can also be illuminated via optical waveguides or through free space, as desired.

The photodetectors are reversed biased by voltage source 52 through low-pass filter 54. The low-pass filter allows DC current to flow to the photodetector array, but prevents high frequency energy from entering the bias supply. High-pass filter 56 allows high frequency current to flow into an external load, but prevents the passage of DC current. Impedance matching/compensation circuit 58 matches the impedance of the photodetector array to the external load impedance, usually 50 ohms. This circuit may also compensate for variation in the frequency response of the photodetector array and high-pass filter. Circuit 58 is optional, and is only necessary for applications requiring impedance matching to the external load, and/or frequency response compensation.

Low-pass filter 54 may comprise a series inductor, and high-pass filter 56 may comprise a series capacitor. For certain specialized applications, the invention may be used to sum pulse code modulated optical signals. For such a case, DC coupling would be required between the photodetector array and an external load, as well as between the photodetector array and voltage source 52. DC coupling could be accomplished by using a series resistance for low-pass filter 54, and by eliminating the high-pass filter.

The invention operates by summing the photocurrents produced by each of the parallel connected photodetectors 60. Each photodetector may comprise a PIN photodiode, a Schottky photodiode, an avalanche photodiode, or a photoconductor. At low frequencies, a photodiode can be modeled as a current source whose output photocurrent $I_{pd}$ is proportional to the incident optical power on the device, i.e., $$I_{pd} = R \cdot P_{op} \tag{1}$$

where $P_{op}$ is the incident optical power on the device in watts, and R is the responsiveness of the photodiode in amps per watt. N photodiodes connected in parallel will deliver a current $I_L$ to an external load equal to the sum of the photocurrents from each individual photodiode, as given by $$I_L = R \sum_{n=1}^{N} P_{op}^n \tag{2}$$

where $P^n op$ is the optical power incident on the nth photodiode. Thus, the output signal $I_L$ is equal to the sum of the optical powers of the input signals.

Figure 4:
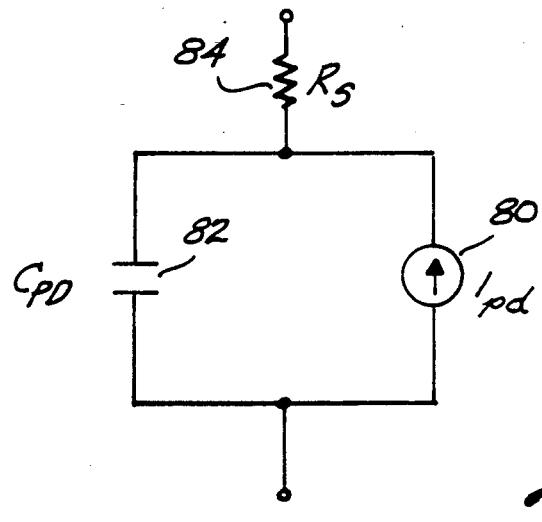
FIG. 4 is an equivalent circuit diagram of one of the photodiodes.
Figure 5:
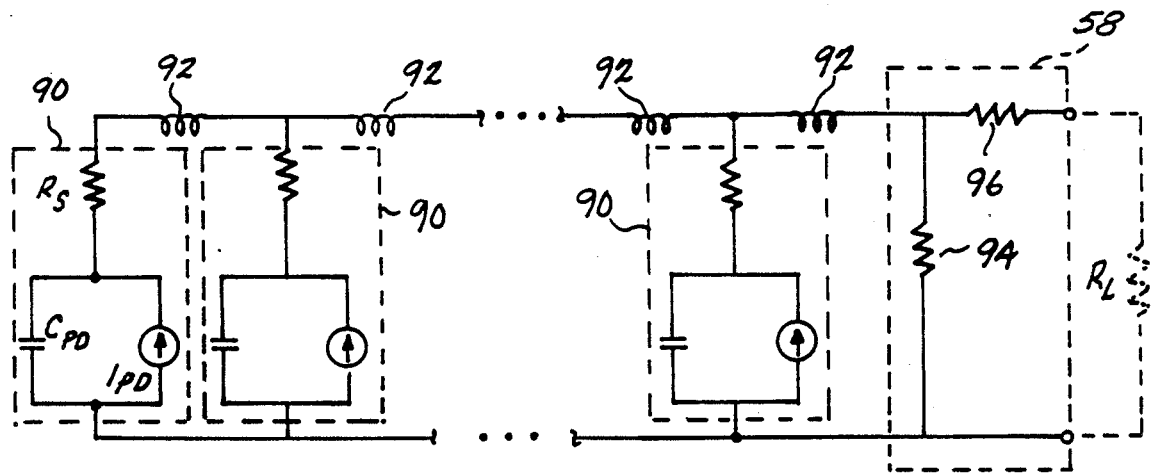
FIG. 5 is an equivalent circuit diagram/schematic diagram of the photodiode array.

The above analysis becomes more complex at RF and microwave frequencies, where a more accurate photodiode model that accounts for device reactance is required. A very accurate model for a high frequency PIN photodiode is shown in FIG. 4. The model includes current source 80 that produces a current $I_{pd}$, in parallel with a depletion capacitance 82 and a series contact resistance 84. FIG. 5 shows an RF equivalent circuit model for the photodiode array, comprising N parallel connected single device equivalent circuit models 90. Parasitic inductances 92 have been included between the photodiodes. The current output from any one photodiode is loaded down at high frequencies by the depletion capacitance and contact resistance of the other parallel connected photodiodes. Therefore, there is a practical limit to how many photodiodes can be used in a summing array for some required bandwidth of operation. In addition, the parasitic inductances must be minimized for high bandwidth operation.

Variations in the frequency response of the photodetector array can be partially compensated for by impedance matching/compensation circuit 68 shown in FIG. 5. The combination of shunt resistance 94 and series resistance 96 does an excellent job of impedance matching and compensating the circuit over a very wide frequency band. One effective way of minimizing parasitic inductances 92 is to fabricate the photodiode array as a monolithic rather than a hybrid device. Monolithic photodiode arrays also have better performance uniformity than hybrid devices, and are also cheaper to manufacture. In addition, the use of monolithic fabrication techniques allows the spacing between the photodiodes to be precisely set to submicron tolerances, thereby assisting the uniform coupling of light from the fiber-optic cables to the photodiodes, as further described below. Computer simulations based upon the equivalent circuit shown in FIG. 5 have demonstrated that the invention is capable of extremely high bandwidth operation, e.g., in excess of 20 GHz. The bandwidth appears to be limited by the transit time of the carriers in the photodiodes, rather than by the reactance of the circuit. Such simulations assumed depletion capacitances 82 of 0.1 pF, contact resistors 84 of 3 ohms, and parasitic inductances 92 of 0.1 nH for a hybrid circuit or 0.01 nH for a monolithic circuit.

Figure 6:
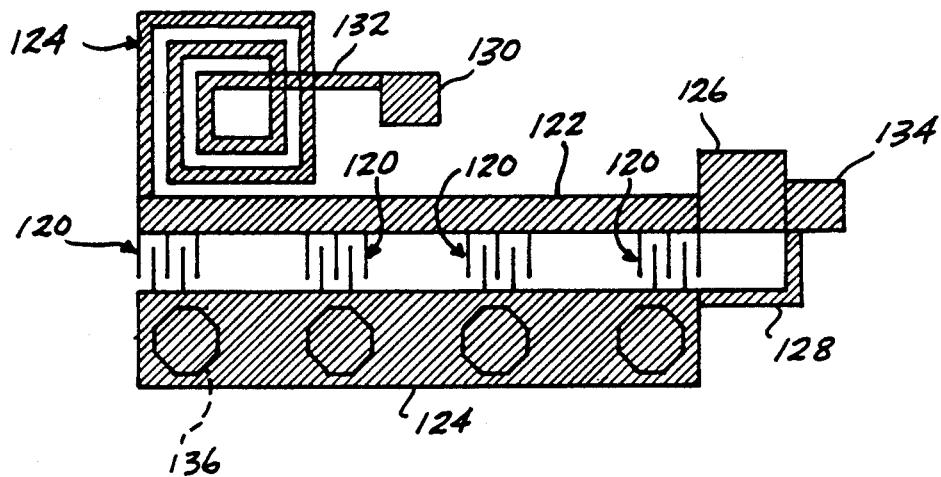
FIG. 6 is a first preferred layout for the signal summing device.

FIG. 6 illustrates a preferred layout for a four photodiode linear array. The layout includes four photodiodes 120 connected between conductive strips 122 and 124, spiral inductor 124, MIS capacitor 126, and ion implanted resistor 128. Strips 122 and 124 correspond to conductive lines 70 and 72 in FIG. 3. The circuit is connected to a voltage source via bond pad 130, the bond pad being connected to spiral inductor 124 by airbridge 132. The spiral inductor corresponds to low-pass filter 54 shown in FIG. 3. The circuit further includes bond pad 134 that is connected to strip 122 via capacitor 126, and to strip 124 by resistor 128. The function of resistor 128 is to match the output impedance to a particular value, such as 50 ohms. Capacitor 126 corresponds to high-pass filter 56 shown in FIG. 3.

Each of strips 122 and 124 should be relatively wide, to minimize parasitic inductance. Each photodiode 120 may be implemented as an interdigitated back-to-back Schottky diode, sometimes referred to as a metal-semiconductor-metal (MSM) photodiode. The active area of such photodiodes are the spaces between their metal fingers. Preferably, strip 124 is connected to a ground plane on the backside of the circuit board (not shown) using via holes 136.

Figure 7:
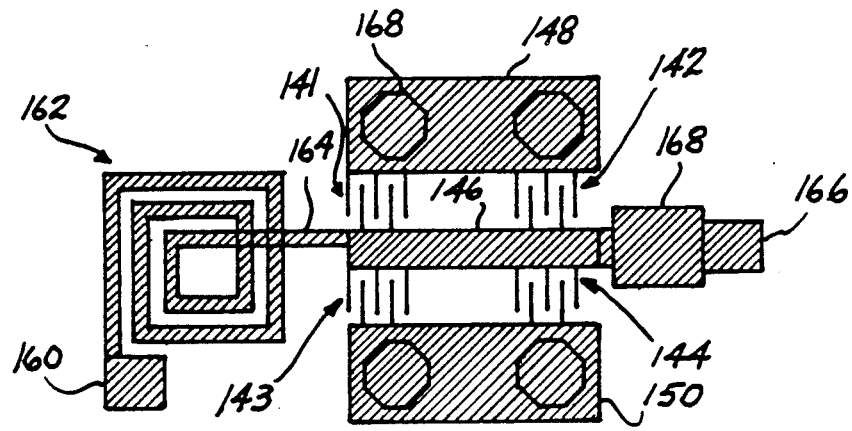
FIG. 7 is a second preferred layout of the signal summing device.

A preferred layout for a rectangular (as opposed to linear) photodetection array is shown in FIG. 7. This arrangement includes photodiodes 141–144 arranged in a rectangular pattern. Photodiodes 141 and 142 are connected between common strip 146 and outside strip 148, while photodiodes 143 and 144 are connected between common strip 146 and outside strip 150. Common strip 146 is connected to bonding pad 160 via spiral inductor 162 and airbridge 164, as in the FIG. 6 embodiment. Common strip 146 is also connected to bonding pad 166 via capacitor 168. Outside strips 148 and 150 are connected to a ground plane on the opposite side of the circuit board by means of vias 168. The embodiment of FIG. 7 provides a lower parasitic inductance, because of the more compact design.

For the purpose of the present invention, it is important to achieve uniform coupling from the optical fibers to the active areas of the photodiodes. One preferred coupling technique is shown in FIG. 8. In this embodiment, fiber-optic cables 24(1)–24(4) are positioned with respect to summing circuit 180 by support 182. It will be assumed that summing device 180 comprises the embodiment shown in FIG. 6, in which photodiodes 120 are arranged in a linear array. Support 182 supports fiber-optic cables 24(1)–24(4) such that the ends of the fiber-optic cables directly abut respective photodiodes 120. The support includes four uniformly spaced V grooves etched in one of its surfaces. The support preferably comprises silicon, and thus may be produced by well-known silicon etching techniques.

For interfacing the fiber-optic cables to a rectangular array design, such as the one shown in FIG. 7, the arrangement of FIG. 9 may be used. In this embodiment, fiber-optic cables 24(1)–24(4) are positioned with respect to summing device 190 by alignment plate 192 that is secured directly to summing device 190. The fiber-optic cable ends are positioned such that they abut photodiodes 141–144. Alignment plate 192 includes four circular openings 194 through which fiber-optic cables 24(1)–24(4) are inserted. Openings 194 could again be produced by well-known silicon micromachining techniques. In this embodiment, the photodiodes, and therefore openings 194, cannot be placed so close together that there is optical crosstalk between the input signals. A monolithic design produced using the arrangement of FIG. 9 can be produced in an area of less than 1.5 millimeters square.

Figure 10:
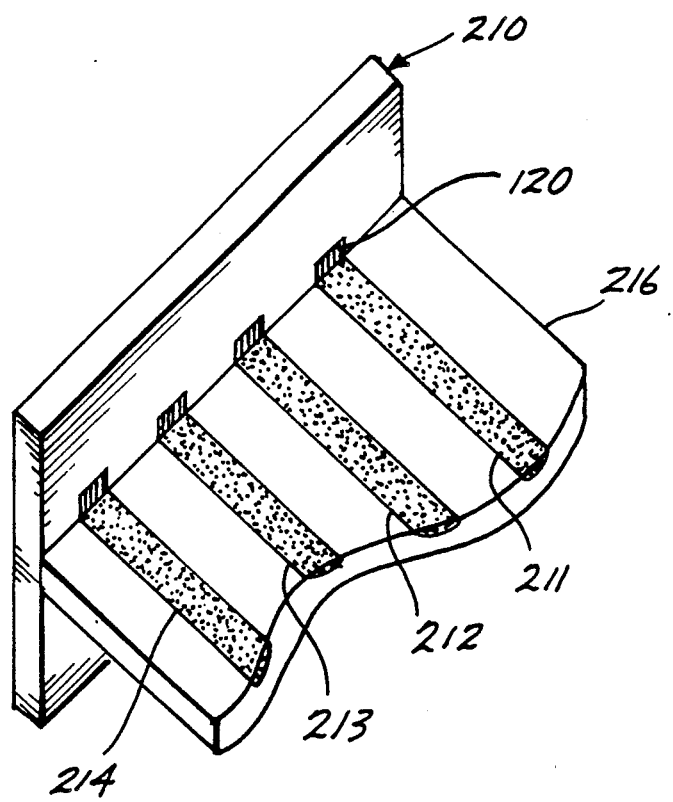
FIG. 10 is a third preferred embodiment showing the coupling of the optical signals to the photodiode array.

A third embodiment for the coupling of the optical signals to the summing device is shown in FIG. 10. This embodiment includes summing device 210 having its photodiodes 120 arranged in a linear array. The optical input signals are provided on planar optical waveguides 211–214 created in substrate 216. Such waveguides can be formed by diffusing titanium into a lithium-niobate substrate. The ends of waveguides 211–214 directly abut the photodiodes on summing device 210.

An important consideration for practicing the invention involves impedance matching. For most practical systems, the output impedance of the summing circuit should be 50 ohms. An amplifier with a 50 ohm input impedance will often be connected to the output of the invention, to boost the weak signals from the photodetectors. Matching the output impedance of the invention to the input impedance of the amplifier will prevent reflections at the interface. The shunt and series resistance matching/compensation circuit shown as block 58 in FIG. 5 can do a good job of impedance matching over a broad frequency range. However, the power dissipated in the matching resistors is wasted. If the optical intensity modulation signals to be summed occupy a narrow frequency band, then reactive impedance matching can produce maximum power transfer to the load. For such a case, the impedance matching circuit 58 can consist of purely lossless matching elements such as inductors, capacitors, and transmission lines.

While the preferred embodiments of the invention have been illustrated and described, variations will be apparent to those skilled in the art. Accordingly, the scope of the invention is to be determined by reference to the following claims.

The embodiments of the invention in which an exclusive property or privilege is claimed are defined as follows:

1. A device for receiving a plurality of optical signals, each optical signal having an intensity, and for producing an electronic output signal having a magnitude corresponding to the sum of said intensities, the device comprising:

a plurality of photodetectors for receiving the respective plurality of optical signals;

means for connecting the photodetectors with one another in parallel between first and second common conductor lines;

means for applying a bias voltage between said lines, such that each photodetector is reverse biased;

a pair of output terminals; and high-pass filter means connected between said lines and the output terminals, whereby the device produces said output signal at the output terminals in response to the receipt of one or more of said optical signals.

2. The device of claim 1, wherein the means for applying a bias voltage comprises a voltage source and a low-pass filter connected between the voltage source and the common conductor lines.

3. The device of claim 1, further comprising a frequency compensation circuit connected between the high-pass filter means and the output terminals, the frequency compensation circuit comprising means for compensating for the frequency response characteristics of the photodetectors and high-pass filter.

4. The device of claim 1, further comprising impedance matching means connected between the high-pass filter means and the output terminals.

5. The device of claim 1, wherein the photodetectors are physically arranged in a linear array.

6. The device of claim 1, wherein the photodetectors are physically arranged in a rectangular array.

7. The device of claim 1, wherein the optical signals are provided on a plurality of fiber-optic cables, and wherein the device further comprises positioning means for supporting the fiber-optic cables such that each optical signal strikes a respective one of the photodetectors upon exiting from the respective fiber-optic cable.

8. The device of claim 7, wherein the support comprises a body having a plurality of grooves etched therein, each groove supporting one fiber-optic cable.

9. The device of claim 6, wherein the support comprises a plate having a plurality of openings etched therein, each opening being sized to receive and support one of the fiber-optic cables.

* * * * *